United States Patent [19]

Tyson et al.

[11] Patent Number: 4,588,376

[45] Date of Patent: May 13, 1986

[54] ELECTRIC SIGNAL TRANSFER SYSTEMS

[75] Inventors: Joseph H. Tyson, Culcheth; Leslie P. Kennett, Croft; Iain S. Davidson, Ingal, all of England

[73] Assignee: British Nuclear Fuels plc, Risley, England

[21] Appl. No.: 718,117

[22] Filed: Apr. 1, 1985

[30] Foreign Application Priority Data

Apr. 13, 1984 [GB] United Kingdom ................. 8409640
Dec. 17, 1984 [GB] United Kingdom ................. 8431755

[51] Int. Cl.[4] .......................... F27B 1/26; G01K 1/08; G01K 7/00

[52] U.S. Cl. ...................................... 432/36; 374/141; 374/154; 374/166

[58] Field of Search ............. 432/36, 103; 236/15 BB; 374/139, 141, 166, 153, 154

[56] References Cited

U.S. PATENT DOCUMENTS

| | | | |
|---|---|---|---|
| 3,825,405 | 7/1974 | Suga | 432/36 |
| 4,397,569 | 8/1983 | Davis | 374/154 |

FOREIGN PATENT DOCUMENTS

| | | |
|---|---|---|
| 670988 | 4/1952 | United Kingdom . |
| 697637 | 9/1953 | United Kingdom . |
| 1140679 | 1/1969 | United Kingdom . |
| 1371856 | 10/1974 | United Kingdom . |

*Primary Examiner*—John J. Camby
*Attorney, Agent, or Firm*—William R. Hinds

[57] ABSTRACT

A rotary kiln has a number of thermocouples respectively sensing the kiln temperature at spaced locations and respectively connected to annular slip rings each in kiln sections. Laterally facing peripheral surfaces of the rings are respectively cooperable with brush contacts connected to a bar and a fork which embraces a ring moveable axially with the rings. Thus, on longitudinal expansion of the kiln the contacts are caused to move with the rings. The electric signal from the thermocouples are fed to a stationary sensor. In a modification the ring sections are electrically isolated and each section is connected to a respective sensor. Position sensors may be used to detect the rotary position of the kiln. The invention can be applied to other sensors.

15 Claims, 13 Drawing Figures

ELECTRIC SIGNAL TRANSFER SYSTEMS

This invention relates to an electric signal transfer systems for transferring electric signals from a rotary kiln to a stationary receptor for the signals.

A rotary kiln may be used for gas/liquid/solid counter or co-current reactions. A rotary kiln assembly usually comprises an inlet arrangement, a rotary kiln, and an outlet arrangement, it being understood that product materials can be fed into or extracted from either the inlet arrangement or the outlet arrangement. Seal arrangements are provided between the rotary kiln and the inlet arrangement and the outlet arrangement.

Rotary kiln assemblies may operate within a large temperature range extending from room temperature to several hundred degrees Celsius. This means that allowance must be made for differential thermal expansion of the rotary kiln relative to the inlet and the outlet arrangements. Excessive heating of the rotary kiln must also be prevented to protect product materials inside the rotary kiln, and materials used in the construction of the rotary kiln.

One problem presented by relatively long rotary kilns is that of transferring electric signals, for example from sensing devices on the rotary kiln, to a stationary receptor such as a control system.

According to the invention a rotary kiln has a plurality of sensing means thereon, and an electric transfer system for transferring electric signals from the sensing means to a stationary receptor, the transfer system comprising a plurality of co-axial, electrically conducting, substantially annular members, a respective electrically conductive contact member for each annular member arranged to contact a laterally facing peripheral surface of the respective annular member, the annular members and the contact members being arranged such that rotation of the rotary kiln causes relative rotation between the annular members and the contact members, and means for causing longitudinal displacement of the contact members corresponding to any longitudinal displacement of the annular members.

Preferably, the annular members are mounted co-axially on the rotary kiln and are electrically connected to the sensing means, the contact members being electrically connectable to the receptor. Resilient means may be provided to bias the contact members towards the respective annular members.

The displacement means may comprise a ring member co-axial with and longitudinally displaceable with the annular members, a translational member upon which the contact members are mounted and extending parallel to the axis of the rotary kiln, and a guide member mounted on the translational member, the guide member being located about the ring member so as to cause translational movement of the translational member corresponding to any longitudinal displacement of the ring member.

Desirably, the guide member is biased towards one axial side of the ring member, and comprises a fork member having tines about the ring member. Each annular member may comprise a plurality of segments arranged in a slight eccentric relationship to each other to produce corresponding slight radial displacement of the contact members during said relative rotation. Desirably, the eccentric relationship of the segments in such as to produce radial inward displacement of the respective contact member during said relative rotation in a selected direction.

In one arrangement transfer of the electrical signals from the sensing means to the stationary receptor is effected through the agency of a number of sets of part-annular members such that, during each revolution of the rotary member, each contact member successively engages each part-annular member of a respective set, said part-annular members being electrically isolated from each other and being electrically connected to respective sensing means.

In this way, during each revolution, electrical continuity is effected between each contact member and the sensors to which the corresponding part-annular members are connected and consequently each contact member serves to transfer a plurality of signals per revolution.

Preferably means for detecting at least one predetermined angular position of the rotary kiln relative to a datum position or positions whereby the output signals obtained from each contact member can be related to the part-annular members (and hence the sensors) from which said outputs are derived.

The sensing means may comprise temperature sensing members. The sensing members may be disposed on the rotary kiln such that some of the sensing members provide electric signals related to the temperature of regions inside the rotary kiln, and some of said sensing members provide electric signals related to the temperature of the rotary kiln.

The invention may be performed in various ways and some specific embodiments will now be further described by way of example only with reference to the accompanying diagrammatic drawings, in which.

Figure 1:
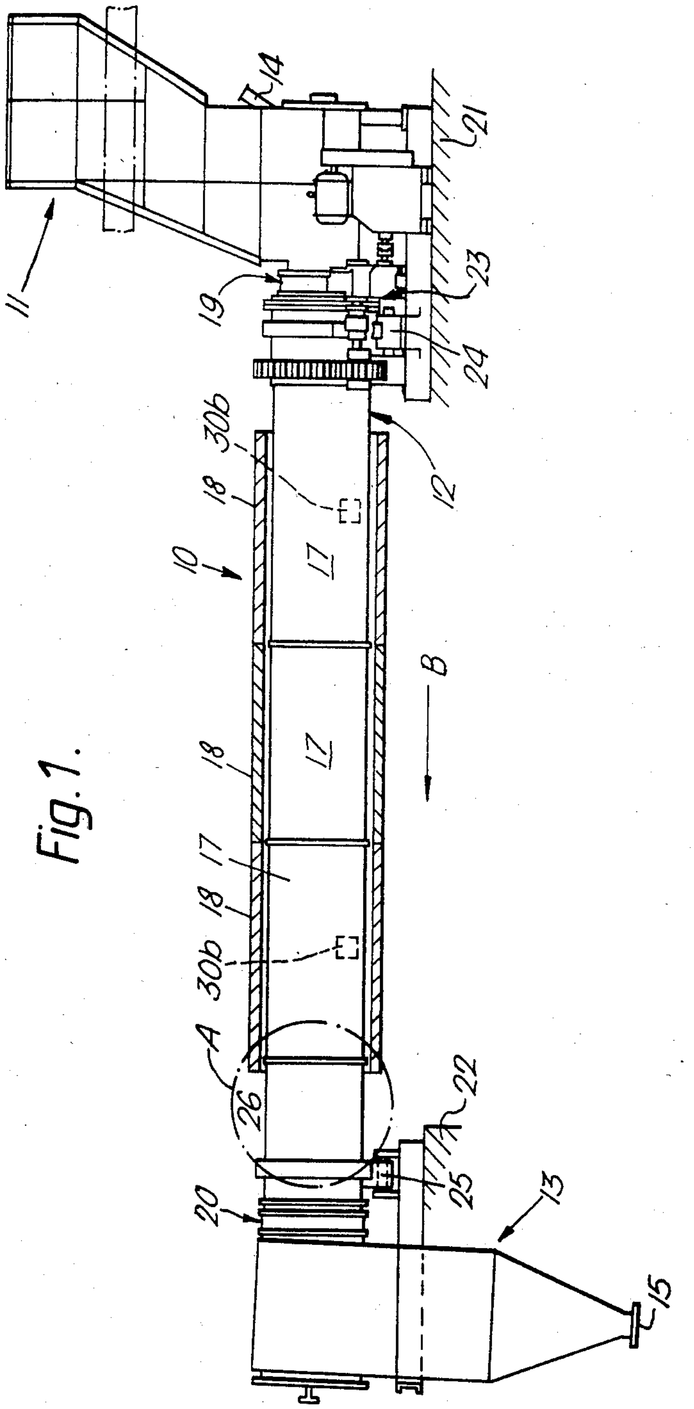
FIG. 1 is a side elevation of a rotary kiln assembly.

Referring now to FIG. 1, a rotary kiln assembly 10 comprises an inlet arrangement 11, a rotary kiln 12, and an outlet arrangement 13. The inlet arrangement 11 includes a solid material feed inlet 14, and the outlet arrangement 13 includes a material outlet 15. The rotary kiln 12 includes a number of temperature controllable sections or zones 17 heated by respective exterior heater sections or zones 18 (not shown in FIGS. 4 to 7) and cooled by convection coolers (not shown), so that a desired axial and transverse temperature profile can be obtained within the rotary kiln 12.

Seal arrangements 19 and 20 are disposed between the rotary kiln 12 and the inlet arrangement 11 and the outlet arrangement 13 respectively. The rotary kiln assembly 10 is supported on concrete supports 21, 22, with the rotary kiln 12 being carried by respective roller mountings 24, 25 on the supports 21, 22, the mounting 24 also retaining the rotary kiln 12 axially to allow thermal expansion of the rotary kiln 12 to occur over the roller mounting 25. An electric powered drive assembly 23 disposed on the support 21 is arranged to rotate the rotary kiln 12.

The rotary kiln assembly 10 operates in a temperature range extending from ambient temperatures to hundreds of degrees Celsuis, so that allowance has to be made for thermal expansion of components of, or within, the rotary kiln 12. The rotary kiln 12 might expand (direction B FIGS. 1 and 4) of the order of 10 cm towards the outlet arrangement 13 and therefore the seal arrangement 20 must allow for relative axial movement of the rotary kiln 12. Careful control of the temperatures of the sections 17 is important to protect product materials inside the rotary kiln 12, and also the materials used in the construction of the rotary kiln 12 itself. This requires effective temperature monitoring and assessment so that remedial action can be taken promptly, the temperature monitoring being provided by thermocouples 30 (see FIGS. 5 and 7) disposed at selected positions along the rotary kiln 12. The thermocouples 30 enable a clear picture of the kiln surface temperature profile along the rotary kiln 12 to be deduced from the electric signals from the thermocouples 30, by locating a thermocouple 30 axially centrally in each section 17 adjacent to outer surface of the kiln and radially inwards of the heaters 18. A thermocouple **30*a* is also disposed near each end of each section 17 adjacent the outer surface of the kiln to provide electric signals used for switching off the respective heaters 18 in the event of an excessive temperature of the rotary kiln 12 being detected. The heaters 18 are also switched off by failure of any one of the end thermocouples 30*a* of any of sections 17, or by faulty transmission or processing of the signals from the end thermocouples 30*a*. Leads from the thermocouples 30, 30*a* are provided with a loop 31 (see FIG. 5) in each lead before the lead is fed into a housing or channelling 32 on the rotary kiln 12. The housing 32 guides and protects the thermocouple leads from the position where they emerge from the rotary kiln 12 to a region 26 within the circle A of FIG. 1. The loops 31 are provided so that differential thermal expansion of the rotary kiln 12 and a thermocouple lead can be compensated for by flexing of the respective loop 31. Another spare set of thermocouples 30, 30*a* for each section is provided on the opposite side of the kiln (see FIG. 6**) so that if a thermocouple fails the corresponding spare thermocouple may be connected to reduce machine down time.

The thermocouples **30, 30*a* (including the spares) connect to four terminal blocks 40 (see FIGS. 4 and 7) the negative side of all the thermocouples 30 being common to one point 70 in the terminal blocks 40, and the positive side of the thermocouples 30, 30*a* being fed to separate terminals in the blocks 40 via multistrand wiring 71. Single strand wiring in the thermocouple sheath is shown at 72. Each thermocouple 30 positive side from the three sections 17 is connected from the block to a separate copper-coated mild steel slip ring 34 (see FIGS. 3 and 8) and the common negative side is fed to a single slip ring 34*a*. The positive sides of the thermocouples 30*a* in the three sections 17 are connected respectively to further slip rings 34 and the negative sides of the thermocouples 30*a* are connected to another single slip ring 34*a*. The thermocouple spares are only connected to the slip rings when required. A cold pot seal 41 connects the major thermocouple wiring 72 to flexible wires 71 for connection into the terminal block 40. The seals 41 are held in a frame 42 secured to the kiln 12 and to which the terminal block 40** is secured.

Figure 3:
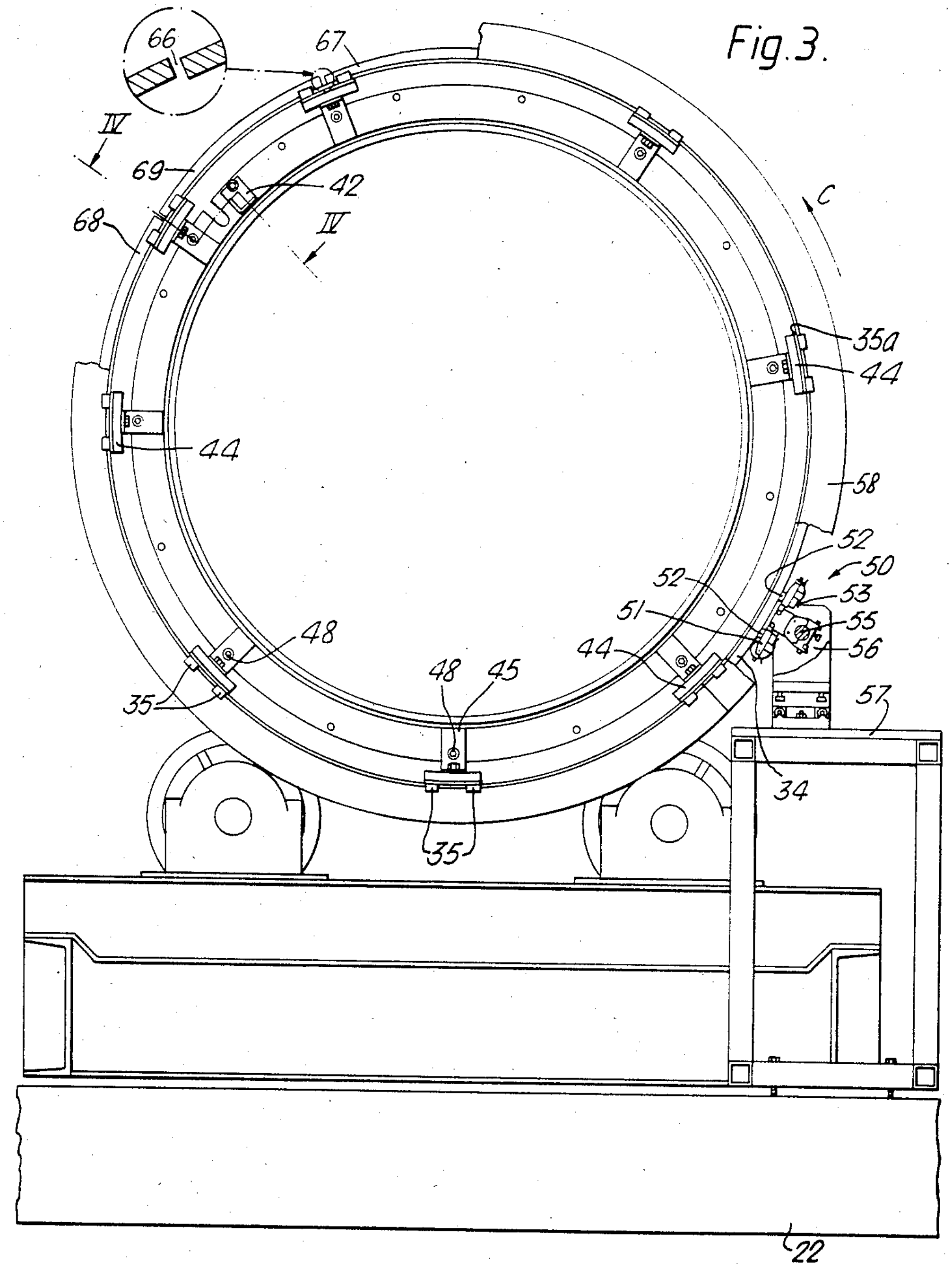
FIG. 3 is an axial view of a slip ring and contact assembly on line III—III of FIG. 2.
Figure 4A:
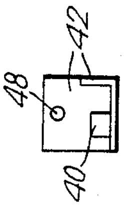
FIG. 4A is a view on line A—A of FIG. 4.
Figure 4:
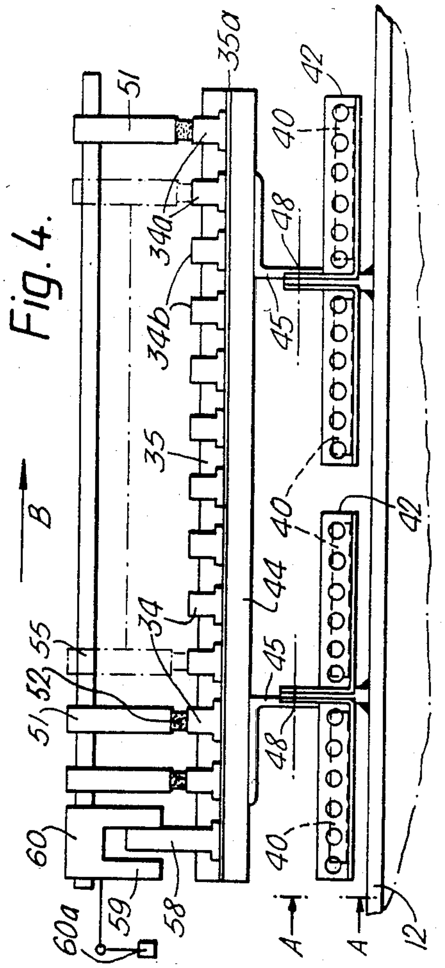
FIG. 4 is a side view of part of a slip ring assembly on the line IV—IV of FIG. 3.
Figure 6:
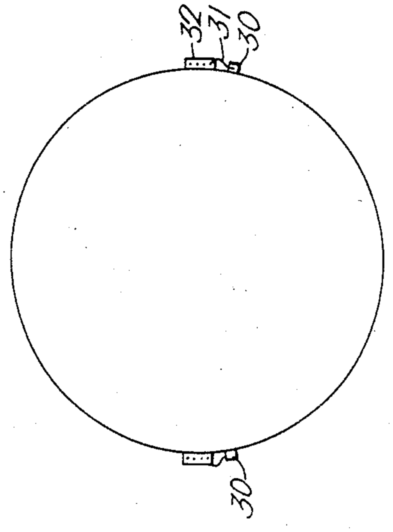
FIG. 6 is an axial view of FIG. 5 on the line VI—VI.
Figure 5:
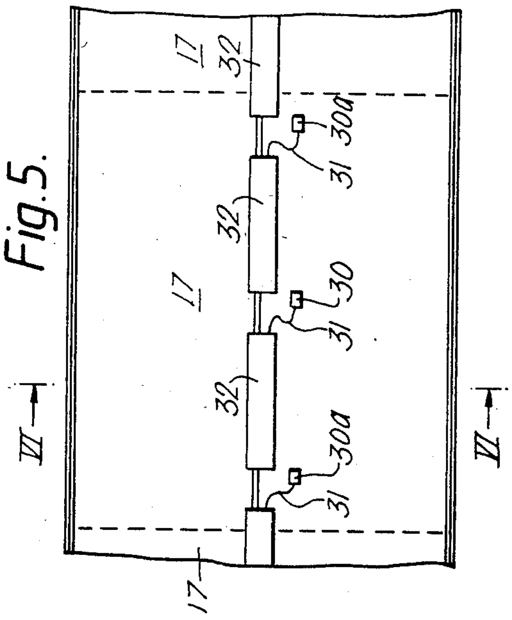
FIG. 5 is a part side view of a kiln.
Figure 7:
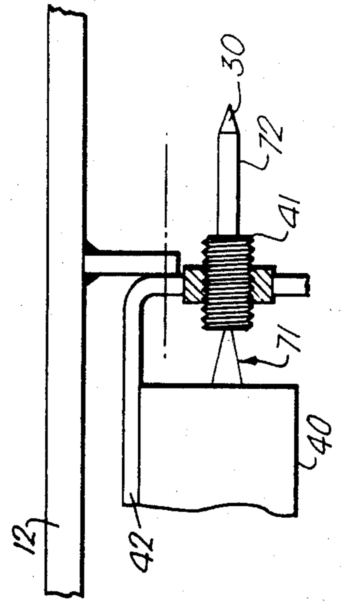
FIG. 7 shows a thermocouple mounting.

From the terminal block 40, wiring to each slip ring **34, 34*a* is duplicated by being connected in parallel to both of the major slip ring sections, as mentioned later. The slip rings 34, 34*a* are carried on angularly spaced axial metal plates 44 (FIG. 4) with suitable insulating material sheets 35*a* being interposed to ensure that the slip ring signals cannot short together, the plates 44 being supported on brackets 45 which are in turn bolted to the kiln 12 via bolts 48 (FIGS. 3 and 4). The thermocouple terminal blocks 40 are supported on the frames 42 (see FIG. 4). The slip rings 34, 34*a* are co-axial, electrically conducting and substantially annular. The rings 34, 34*a* are electrically insulated from each other by insulating brushes 35 which receive bolts (not shown) which hold the rings to the sheets 35*a* and plates 44**.

Figure 2:
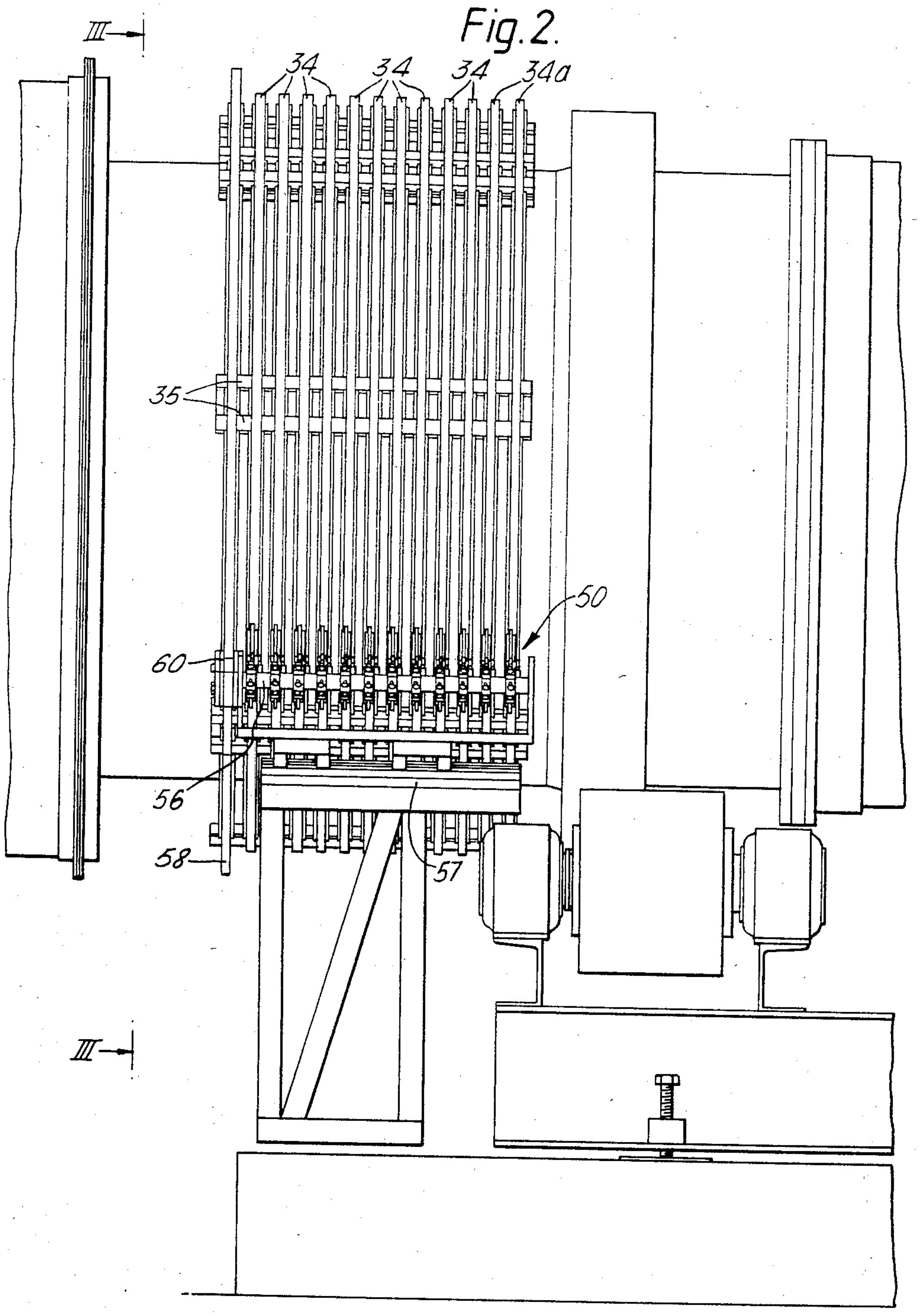
FIG. 2 is a side elevation of a slip ring or sensing assembly.

From FIG. 3 it can be seen that electrical signals from the slip rings **34, 34*a* are collected by respective electrically conductive contact members in the form of brushgear arrangements 50, each brush comprising a holder 51 carrying a pair of carbon brushes 52 loaded by a spring 53 so as to engage the outer peripheral face 34*b* of the respective slip ring, and electrically connected in parallel to provide redundancy. Each holder 51 is mounted on a translational member or bar 55, located on a carrier 56 (not shown in FIG. 4) and which is traversable in a direction B FIG. 4 longitudinally of the rotary kiln 12 relative to a fixed table 57. This allows for axial expansion and contraction movement of the rotary kiln 12 relative to its fixed end at the roller mounting 24. The movement of the bar 55 relative to the table 57 is controlled by a traversing ring 58 on the kiln 12 of larger diameter than the rings 34, 34*a* and disposed at the heater 18 side of the collection of rings 34, 34*a* (FIG. 2). The traversing ring 58 locates between the tines 59 of a guide member or fork 60 (FIG. 4) at one end of the bar 55. Leads (not shown) from the brushes 52 are connected to monitoring equipment (to be described with reference to FIG. 8 below), which provides a temperature profile display and can serve to actuate control equipment for countering any temperature reading which is considered to be outside a tolerance range. The fork 60 may be biased such as by having a weight dependent therefrom as shown schematically at 60*a* in FIG. 4, so that the fork 60 is always in abutment with one side of the traversing ring 58, thereby ensuring that movement of the traversing ring 58 is accurately transmitted to the bar 55**.

The slip rings **34, 34*a* are split into three segments indicated by a minor segment 69, and two major segments 67, 68 in FIG. 3, for ease of assembling on the kiln and to permit ready access. The segments 67, 68, 69 are also arranged such that during rotation of the kiln 12 in a selected direction C FIG. 3, the brushes 52 move radially downwardly on a step 66 (shown exaggerated) between the segments 67 and 68 and between the segments 68 and 69 and between segments 69 and 67. This ensures that the brushes 52 are not subjected to undue breakage forces when passing over a joint between the segments 67, 68, 69. The step may for example be 0.16 cm. Further, the rings 34, 34*a* are arranged to be slightly eccentric, so that radial movement of the brushes 52 and their associated springs 53 is assured during operation to stop the brushes 52** becoming set in one position.

Figure 8:
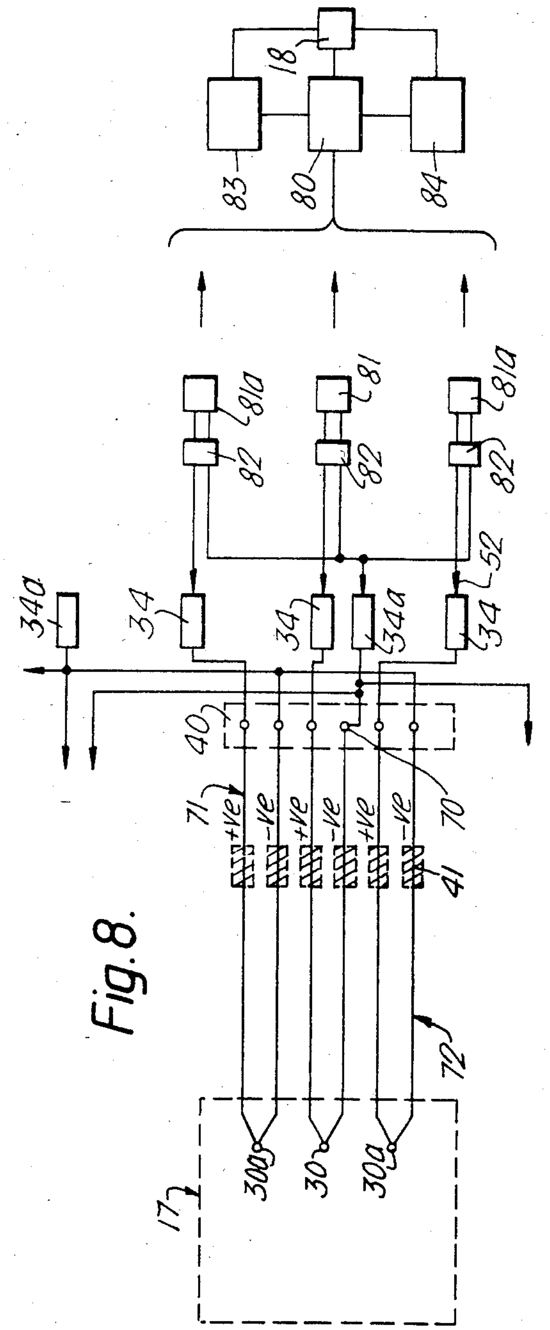
FIG. 8 illustrates electrical connections to thermocouples.
Figure 9:
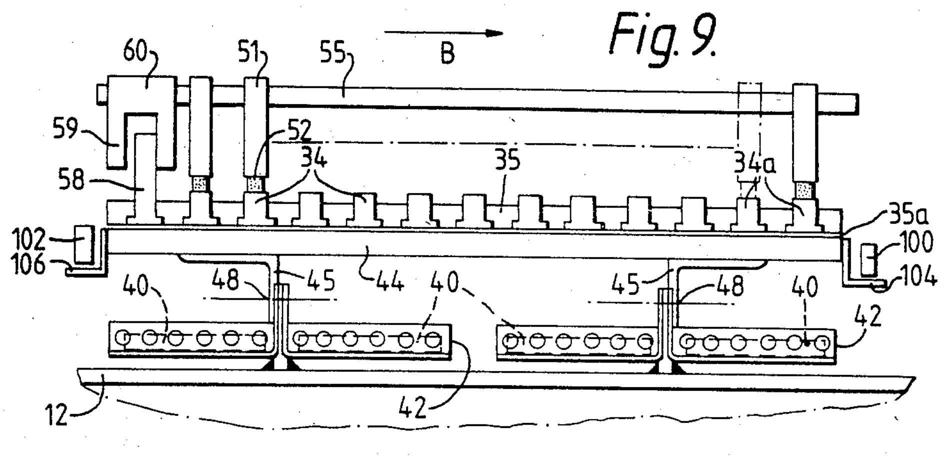
FIG. 9 is a side view of part of a slip ring assembly corresponding to that shown in FIG. 4 with the addition of proximity detectors.

Reference is now directed to FIG. 8, from which an outline of plant operation can be deduced and in which like reference numerals in preceding Figures are used for like parts. In FIG. 8, the central thermocouple 30, being the temperature controlling thermocouple, and the end thermocouples 30*a*, being the shutdown thermocouples as aforesaid, the negative leads of all the thermocouples 30 (only one section shown in FIG. 8) are commoned by a line 70. The line 70 feeds to the negative input of measuring devices 81, 81*a*, one device being provided for each of the thermocouples 30, 30*a*. In order to inhibit common mode failures, an opto-isolator 82 is arranged between the line 70 and the device 81, 81*a* in each case. The positive side of each thermocouple 30, 30*a* is fed to the positive input of a respective one of the devices 81, 81*a*. In FIG. 8, the slip rings 34, 34*a* are shown diagrammatically. Outputs from the devices 81, 81*a* are fed to a plant monitoring apparatus 80. Outputs from devices 81*a* go to over-temperature protection devices 83 which reduce or cut off the supply to the heaters 18 when an over-temperature is sensed, and devices 81 are connected to a temperature control device 84 which adjusts or cuts off the supply to the heaters 18 to maintain the sensed temperature in a desired range or at a desired value. These monitoring features are deemed within the knowledge of the skilled man and are shown schematically.

It is to be understood that fewer or additional thermocouples may be provided depending on the application. For example, in the rotary kiln 12 a thermocouple 30*b* (see FIG. 1) may be located inside the kiln longitudinally centrally along the length thereof, to monitor the temperature of the product being treated in the rotary kiln 12, this additional thermocouple having its positive side connected to a separate slip ring 34 but having its negative side connected to the same slip ring 34*a* as that used by the common negatives from the central thermocouples 30 of FIG. 5. Hence spare slip rings 34 may be provided to allow additional thermocouples to be fitted during use of the rotary kiln assembly.

In FIG. 2 twelve slip rings 34, 34*a* are shown, which allows a slip ring 34 for each thermocouple 30, 30*a* (i.e. nine) and two slip rings 34*a* used as common slip rings respectively by the central thermocouples 30 and the end thermocouples 30*a*, (a total of eleven slip rings). The spare slip ring 34 may be used with an aforesaid additional thermocouple inside the rotary kiln 12, or for some other application. On some occasions, further thermocouples might be provided inside the rotary kiln 12 near the ends, these thermocouples being located in cantilevered metal tubes extending into the rotary kiln 12, so that leads from such thermocouples may be connected to control equipment without being transmitted through the slip rings 34, 34*a* and the associated brushes.

Figure 10:
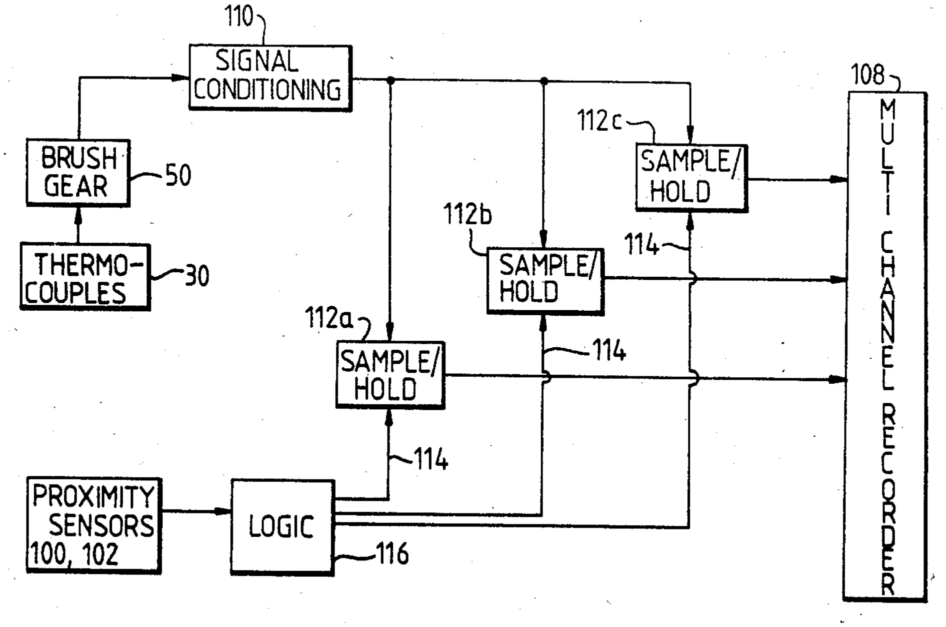
FIG. 10 is a block diagram of circuitry for correlating the outputs of the contact members with the respective sets of sensors.
Figure 11:
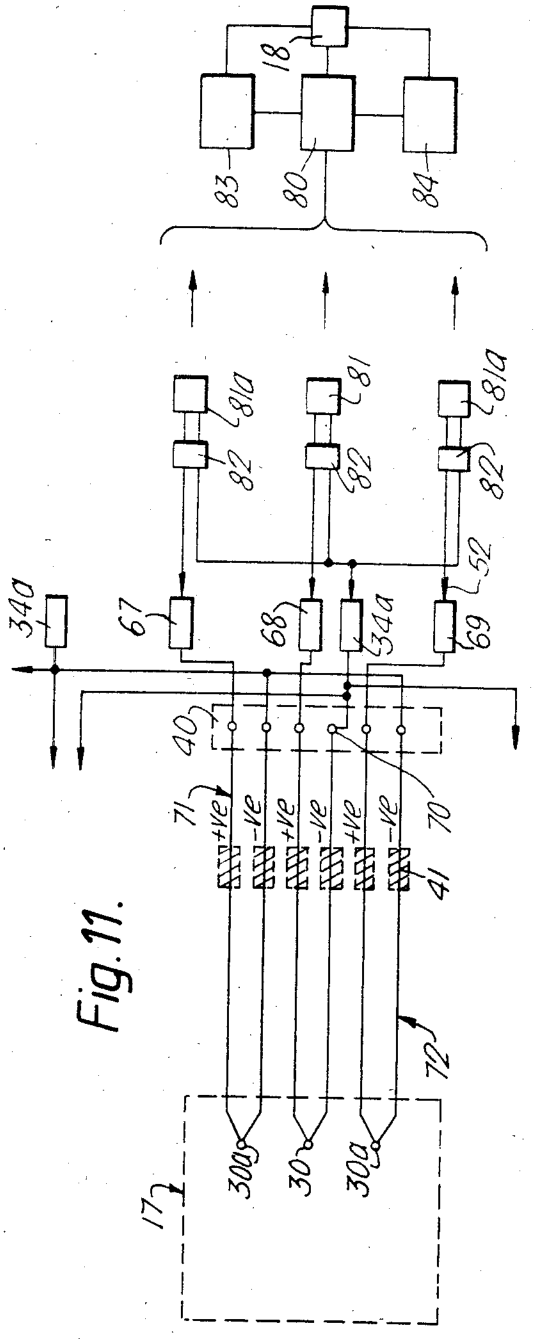
FIG. 11 is a modification of FIG. 8.
Figure 12:
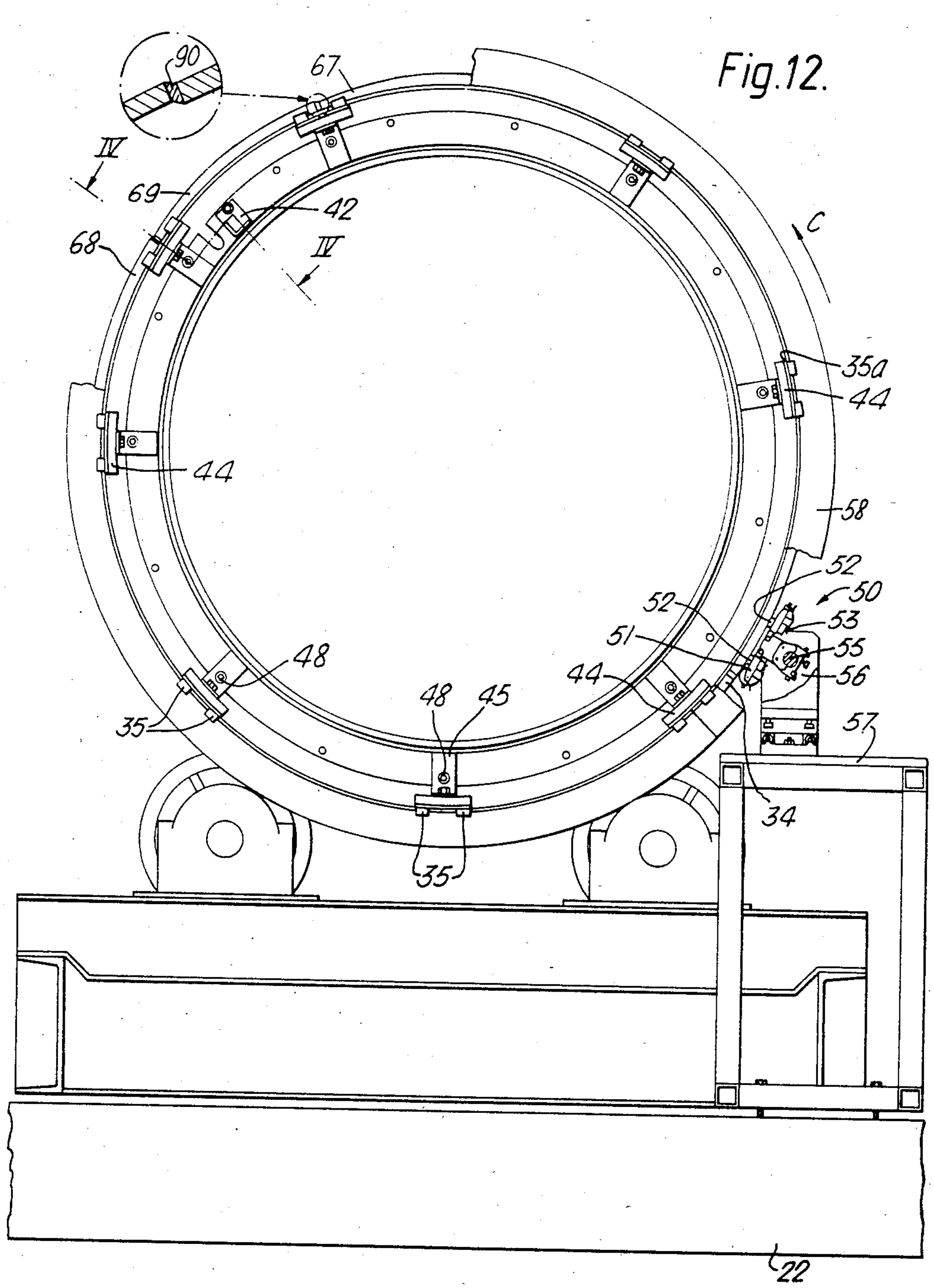
FIG. 12 is a modification of FIG. 3.

With reference to FIGS. 9 to 12, which provide a more compact signal transfer system, as described above, each slip ring 34, 34*a* is fabricated from three part-annular segments which are electrically connected together. In accordance with the modified arrangement, the segments forming each slip ring 34 (but not slip rings 34*a*) are electrically isolated from one another by omitting electrical braiding or such like interconnecting them and by introducing electrically insulating inserts 90 FIG. 12 (e.g. PTFE inserts) between the adjacent ends of the segments. In addition, instead of a single sensor (e.g. thermocouple) being connected to a slip ring, according to the modification a different sensor is connected to each segment of each slip ring so that each slip ring 34 is coupled to three sensors (FIG. 11). Such an arrangement enables the number of slip rings 34 to be reduced considerably. As before, one pole (e.g. negative side) of each sensor may be connected to the common slip ring 34*a*.

Although in the embodiment described above, each slip ring 34 is divided into three segments, a greater or lesser number of segments per slip ring may be employed with a corresponding number of sensors coupled to each set of segments. The segments of each ring are so arranged that the gaps therebetween are all substantially aligned axially with the corresponding gaps between the segments of all of the other sets.

To facilitate discrimination between the segments in each set and thereby correlate the outputs of each brushgear arrangement 51, 52, means is provided for furnishing signals indicative of the position of the kiln. Such means may comprise, for example, suitably arranged inductive-type proximity sensors 100, 102 and targets or markers 104, 106. Thus, for example, the sensors 100 and 102 are mounted on stationary structure and the targets are rotable with the kiln. In one arrangement, one set of axially aligned segments may be associated with two targets 104 and 106; a second set of axially aligned segments may be associated with only a target 104; and the third set of axially aligned segments may be associated with only a target 106. In this way, the outputs of sensors 100, 102 can be used to indicate which segments are traversing the brushgear arrangements 51, 52 at any instant. The targets 104, 106 may be peripherally co-extensive with the segments they are associated with or they may be somewhat shorter in peripheral extent.

Referring now to the diagrammatic circuit of FIG. 10, this illustrates routing of the thermocouple signals from one segmented slip ring to a multichannel recorder 108. The thermocouple signals, after collection by the respective brush gear 50, are processed (e.g. amplified) by signal conditioning circuit 110 and applied to a number of sample and hold circuits 112*a*–*c* whose outputs are connected to different channel inputs of the recorder 108. The circuits 112*a*–*c* are controlled by respective ENABLE signals applied via lines 114 by logic circuitry 116 which, in turn, serves to analyse the outputs of proximity sensors 100, 102 and thereby determine which particular segment of the slip ring ( and hence which thermocouple) is engaged by the brush gear 50. Thus if, for example, proximity sensors 100, 102 both provide outputs indicative of the presence of both targets 104 and 106, circuit 112*a* may be enabled to receive the thermocouple signal and transfer it to recorder 108. If only target 104 is detected, circuit 112*b* may be enabled and, likewise, if only target 106 is detected, circuit 112*c* may be enabled.

In a more sophisticated circuit arrangement, a microprocessor may be utilised in such a way that, during the time the brush gear is engaged with each segment, the thermocouple signal is repeatedly sampled to derive for example an average value which is then fed to the multichannel recorder.

Although the invention has been described in relation to transmitting electric signals from thermocouples, other electric signals may be transmitted, for example from a plurality of strain gauges attached to á rotary member.

We claim:

1. A rotary kiln having a plurality of sensing means thereon, and an electric transfer system for transferring electric signals from the sensing means to a stationary receptor, the transfer system comprising a plurality of co-axial, electrically conducting, substantially annular members, a respective electrically conductive contact member for each annular member arranged to contact a laterally facing peripheral surface of the respective annular member, the annular members and the contact members being arranged such that rotation of the rotary kiln causes relative rotation between the annular members and the contact members, and means for causing longitudinal displacement of the contact members corresponding to any longitudinal displacement of the annular members, said displacement means comprising a ring member co-axial with and longitudinally displaceable with the annular members, a translational member upon which the contact members are mounted and extending parallel to the axis of the rotary kiln, and a guide member mounted on the translational member, the guide member being located about the ring member so as to cause translational movement of the translational member corresponding to any longitudinal displacement of the ring member.

2. A rotary kiln as claimed in claim 1, in which the annular members are mounted co-axially on the rotary kiln and are electrically connected to the sensing means, the contact members being electrically connectable to the receptor.

3. A rotary kiln as claimed in claim 1 including resilient means arranged to bias the contact members radially towards the respective annular members.

4. A rotary kiln as claimed in claim 1, including means biassing the guide member towards one axial side of the ring member, the guide member comprising a fork member having tines about the ring member.

5. A rotary kiln as claimed in claim 1, in which each annular member comprises a plurality of segments arranged in slight eccentric relationship to each other to produce corresponding slight radial displacement of the contact members during said relative rotation.

6. A rotary kiln as claimed in claim 5, in which the eccentric relationship of the segments is such as to produce radial inward displacement of the respective contact member during said relative rotation in a selected direction.

7. A rotary kiln as claimed in claim 1 in which the sensing means comprises temperature sensing members.

8. A rotary kiln as claimed in claim 7, in which the sensing members are disposed on the rotary kiln such that some of the sensing members provide electric signals related to the temperature of regions inside the rotary kiln, and some of said sensing members provide electric signals related to the temperature of the rotary kiln.

9. A rotary kiln having a plurality of sensing means thereon, and an electric transfer system for transferring electric signals from the sensing means to a stationary receptor, the transfer system comprising a plurality of coaxial, electrically conducting, substantially annular members, a respective electrically conductive contact member for each annular member arranged to contact a laterally facing peripheral surface of the respective annular member, the annular members and the contact members being arranged such that rotation of the rotary kiln causes relative rotation between the annular members and the contact members, means for causing longitudinal displacement of the contact members corresponding to any longitudinal displacement of the annular members, transfer of the electrical signals from the sensing means to the stationary receptor being effected through the agency of a number of sets of part-annular members such that, during each revolution of the rotary kiln, each contact member successively engages each part-annular member of a respective set, said part-annular members being electrically isolated from each other and being electrically connected to respective sensing means, and means for detecting at least one predetermined angular position of the rotary kiln relative to a datum position or positions whereby the output signals obtained from each contact member can be related to the part-annular members (and hence the sensors) from which said outputs are derived.

10. A rotary kiln as claimed in claim 9 in which the annular members are mounted co-axially on the rotary kiln and are electrically connected to the sensing means, the contact members being electrically connectable to the receptor.

11. A rotary kiln as claimed in claim 9 including resilient means arranged to bias the contact members radially toward the respective annular members.

12. A rotary kiln as claimed in claim 9 in which each annular member comprises a plurality of segments arranged in slight eccentric relationship to each other to produce corresponding slight radial displacement of the contact members during said relative rotation.

13. A rotary kiln as claimed in claim 12 in which the eccentric relationship of the segments is such as to produce radial inward displacement of the respective contact member during said relative rotation in a selected direction.

14. A rotary kiln as claimed in claim 9 in which the sensing means comprises temperature sensing members.

15. A rotary kiln as claimed in claim 14 in which the sensing members are disposed on the rotary kiln such that some of the sensing members provide electric signals related to the temperature of regions inside the rotary kiln, and some of said sensing members provide electric signals related to the temperature of the rotary kiln.

* * * * *